United States Patent
Chou et al.

(10) Patent No.: US 12,330,159 B2
(45) Date of Patent: Jun. 17, 2025

(54) MULTIPLEX ASSAYS USING SEPARATION STRUCTURE AND WELL STRUCTURE

(71) Applicant: Essenlix Corporation, Monmouth Junction, NJ (US)

(72) Inventors: Stephen Y. Chou, Princeton, NJ (US); Wei Ding, Princeton, NJ (US)

(73) Assignee: Essenlix Corporation, Monmouth Junction, NJ (US)

(*) Notice: Subject to any disclaimer, the term of this patent is extended or adjusted under 35 U.S.C. 154(b) by 374 days.

(21) Appl. No.: 17/787,771

(22) PCT Filed: Dec. 21, 2020

(86) PCT No.: PCT/US2020/066500
§ 371 (c)(1),
(2) Date: Jun. 21, 2022

(87) PCT Pub. No.: WO2021/127665
PCT Pub. Date: Jun. 24, 2021

(65) Prior Publication Data
US 2023/0338954 A1    Oct. 26, 2023

Related U.S. Application Data

(60) Provisional application No. 62/952,173, filed on Dec. 20, 2019, provisional application No. 62/951,999, filed on Dec. 20, 2019.

(51) Int. Cl.
*B01L 3/00* (2006.01)

(52) U.S. Cl.
CPC . *B01L 3/502761* (2013.01); *B01L 2200/0647* (2013.01); *B01L 2200/12* (2013.01);
(Continued)

(58) Field of Classification Search
CPC ....... B01L 3/502761; B01L 2200/0647; B01L 2200/12; B01L 2200/16; B01L 2300/0654;
(Continued)

(56) References Cited

U.S. PATENT DOCUMENTS

2013/0053273 A1    2/2013  Juncker et al.
2014/0004539 A1    1/2014  Simon et al.
(Continued)

FOREIGN PATENT DOCUMENTS

EP      3278877 A1      2/2018
KR   20070120633 A    12/2007
(Continued)

OTHER PUBLICATIONS

International Search Report and Written Opinion of the International Searching Authority established by the ISA/US completed on Apr. 8, 2021, for PCT/US2020/066500.

*Primary Examiner* — Dennis White

(57) ABSTRACT

A multiplex assay device including: a separation structure on a first plate; and a sample contact area on the surface of the first plate. Also disclosed is a method for fabricating a multiplex assay, including: making a reagent into a non-liquid reagent particle; creating a well on a sample contact area of a plate of a Q-card two plate sample card; and dropping one or more of the non-liquid reagent particles into at least one well.

15 Claims, 10 Drawing Sheets

(52) U.S. Cl.
CPC ... *B01L 2200/16* (2013.01); *B01L 2300/0654* (2013.01); *B01L 2300/161* (2013.01)

(58) Field of Classification Search
CPC ......... B01L 2300/161; B01L 2300/023; B01L 2300/0822; B01L 3/50853; G01N 2001/282; G01N 1/2813
See application file for complete search history.

(56) References Cited

U.S. PATENT DOCUMENTS

| | | |
|---|---|---|
| 2015/0276598 A1 | 10/2015 | Nagatomi |
| 2019/0365283 A1 | 12/2019 | Chou et al. |

FOREIGN PATENT DOCUMENTS

| | | | |
|---|---|---|---|
| WO | 2000056456 A1 | 9/2000 | |
| WO | 2016049571 A1 | 3/2016 | |
| WO | 2017048871 A | 3/2017 | |
| WO | 2018148470 | 8/2018 | |
| WO | WO-2018148470 A1 * | 8/2018 | ........... G01N 1/2813 |

* cited by examiner

MULTIPLEX ASSAYS USING SEPARATION STRUCTURE AND WELL STRUCTURE

CROSS REFERENCE TO RELATED APPLICATIONS

This application claims the benefit of priority of U.S. Provisional Patent Application No. 62/951,999, filed on Dec. 20, 2019, and U.S. Provisional Patent Application No. 62/952,173, filed on Dec. 20, 2019, the contents of which are relied upon and incorporated herein by reference in their entirety. The entire disclosure of any publication or patent document mentioned herein is entirely incorporated by reference.

BACKGROUND

The present application relates to devices and methods of separating liquid in assays as well as using a well structure in an assay and a multiplex assay.

SUMMARY

In one or more embodiment, the present invention provides, for example:

A multiplex assay device comprising:
a separating structure selected from, for example, a trench or a hydrophilic strip on a plate; and
a sample contact area,
wherein at least a portion of the separating structure is not covered by the sample contact area.

A device for liquid sample collection and liquid sample analysis, comprising:
a base plate having: at least one well area in at least a portion of a sample image area,
a cover plate that opposes the base plate, the cover plate covers at least a portion of the well area and at least a portion of the sample image area on the base plate;
at least one reagent inside one well;
wherein the opposed base plate and the cover plate define an interior cavity.

A method for fabricating a multiplex assay, comprising:
making a reagent into a non-liquid reagent particle;
creating a well on a sample contact area of a plate of Qcard two plate sample card; and
dropping one or more of the non-liquid reagent particles into at least one well.

BRIEF DESCRIPTION OF THE DRAWINGS

The drawings, described below, are for illustration purposes only. In some Figures, the drawings are in scale and not to scale in other Figures. For clarity purposes, some elements are enlarged when illustrated in the Figures. The drawings are not intended to limit the scope of the disclosure. The drawings assist in understanding embodiments or aspects of embodiments of the present invention.

DETAILED DESCRIPTION

Figure 1:
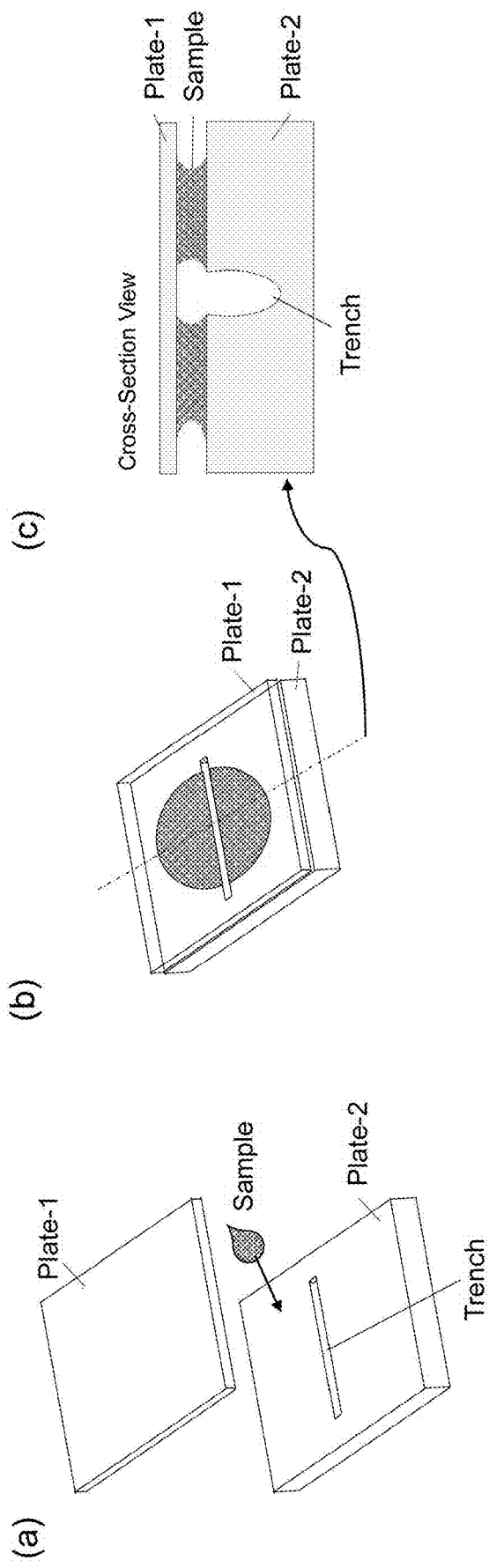
FIG. 1 is an example device with separation structure: (a) shows a device with two plates and separation structure (trench) on one of the plates; (b) shows the tilt view of sample between the two plates, separated by trench on one of the plates; and (c) shows the cross-section view of the device with sample between the two plates, separated by separation structure on one of the plates, wherein the separation structure is a trench on Plate-2 in this example.

The following detailed description illustrates certain embodiments of the invention by way of example and not by way of limitation. If any, the section headings and any subtitles used herein are for organizational purposes only and are not to be construed as limiting the subject matter described in any way. The contents under a section heading and/or subtitle are not limited to the section heading and/or subtitle, but apply to the entire description of the present invention.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

"Trench" refers to a physical structure incorporated into a disclosed assay card or a disclosed diagnostic card. A card having a trench structure is referred to a trenched Q-card, which is distinctly structurally and functionally different from a Q-card. A trench can be divided into three parts, from bottom to top: the bottom base, the wall, and the top plane. In the present disclosure, the trench structure can have one, two, or all three of the aforementioned parts, and can have additional structures associated with the trench. In some embodiments, a trench width can be, for example, greater than its height, equal to its height, less than its height, or a combination thereof.

"Analyte" refers to a molecule (e.g., a protein, peptides, DNA, RNA, nucleic acid, or other molecule), cells, tissues, viruses, nanoparticles with different shapes, and like entities. An "analyte" can be any substance that is suitable for testing in the present method.

"Assaying", "assay", and like terms refer to testing a sample to detect the presence and/or abundance of an analyte.

"Determining," "measuring," "assessing," or "assaying" can be used interchangeably and include both quantitative and qualitative determinations.

"Light-emitting label" refers to a label that can emit light when under an external excitation, for example, luminescence. Fluorescent labels (which can include dye molecules or quantum dots), and luminescent labels (e.g., electro- or chemi-luminescent labels) are types of light-emitting label. The external excitation is light (photons) for fluorescence, electrical current for electroluminescence, and chemical reaction for chemi-luminescence. An external excitation can be a combination of the above.

"Labeled analyte" refers to an analyte that is detectably labeled with a light emitting label such that the analyte can be detected by assessing the presence of the label. A labeled analyte can be labeled directly (i.e., the analyte itself can be directly conjugated to a label, e.g., via a strong bond, e.g., a covalent or non-covalent bond), or a labeled analyte can be labeled indirectly (i.e., the analyte is bound by a secondary capture agent that is directly labeled). "Labeled analyte" and "bound label" can be used interchangeably.

"Hybridizing" and "binding", with respect to nucleic acids, can be used interchangeably.

"Capture agent/analyte complex" is a complex that results from the specific binding of a capture agent with an analyte. A capture agent and an analyte for the capture agent will usually specifically bind to each other under "specific binding conditions" or "conditions suitable for specific binding", where such conditions are those conditions (in terms of salt concentration, pH, detergent, protein concentration, temperature, etc.), which allow for binding to occur between capture agents and analytes to bind in solution. Such conditions, particularly with respect to antibodies and their antigens and nucleic acid hybridization are known in the art (see, e.g., Harlow and Lane (Antibodies: A Laboratory Manual Cold Spring Harbor Laboratory, Cold Spring Harbor, N.Y. (1989) and Ausubel, et. al, Short Protocols in Molecular Biology, 5th ed., Wiley & Sons, 2002).

A "subject" can be any human or non-human animal. A subject can be a person performing the instant method, a patient, a customer in a testing center, and like individuals.

"Well" refers to a physical structure incorporated into a disclosed assay card or a disclosed diagnostic card. A card having a well structure is referred to a well Q-card, which is distinctly structurally and functionally different from a Q-card. A well can be divided into three parts, from bottom to top: the bottom base, the wall, and the top plane. In the present disclosure, the well structure can have one, two, or all three of the aforementioned parts, and can have additional structures associated with the well. In some embodiments, a well width can be, for example, greater than its height, equal to its height, less than its height, or a combination thereof.

A multiplex assay device comprising:
a separating structure selected from, for example, a trench or a hydrophilic strip on a plate; and
a sample contact area,
wherein at least a portion of the separating structure is not covered by the sample contact area.

In some embodiments, the device comprises a first plate, a second plate, spacers, and separation structure such a trench, a coating, or a combination thereof. One or both of the plates comprise separation structures and/or a coating fixed on the inner surface of a respective plate.

In some embodiments, at least part of the separation structure/coating is inside the sample contact area.

In certain embodiments, the two plates of the device are initially on top of each other and need to be separated to get into an open configuration for sample deposition.

In certain embodiments, the two plates of the device are already in the closed configuration before the sample deposition. The sample gets into the device from a gap between the two plates.

The term "open configuration" of the two plates in a QMAX process means a configuration in which the two plates are either partially or completely separated apart and the spacing between the plates is not regulated by the spacers. The term "closed configuration" of the two plates in a QMAX process means a configuration in which the plates are facing each other, the spacers and a relevant volume of the sample are between the plates, the relevant spacing between the plates, and thus the thickness of the relevant volume of the sample, is regulated by the plates and the spacers, wherein the relevant volume is at least a portion of an entire volume of the sample.

FIG. 1 is an example device with separation structure: (a) shows a device with two plates and separation structure (trench) on one of the plates; (b) shows the tilt view of sample between the two plates, separated by trench on one of the plates; and (c) shows the cross-section view of the device with sample between the two plates, separated by separation structure on one of the plates, wherein the separation structure is a trench on Plate-2 in this example.

Figure 2:
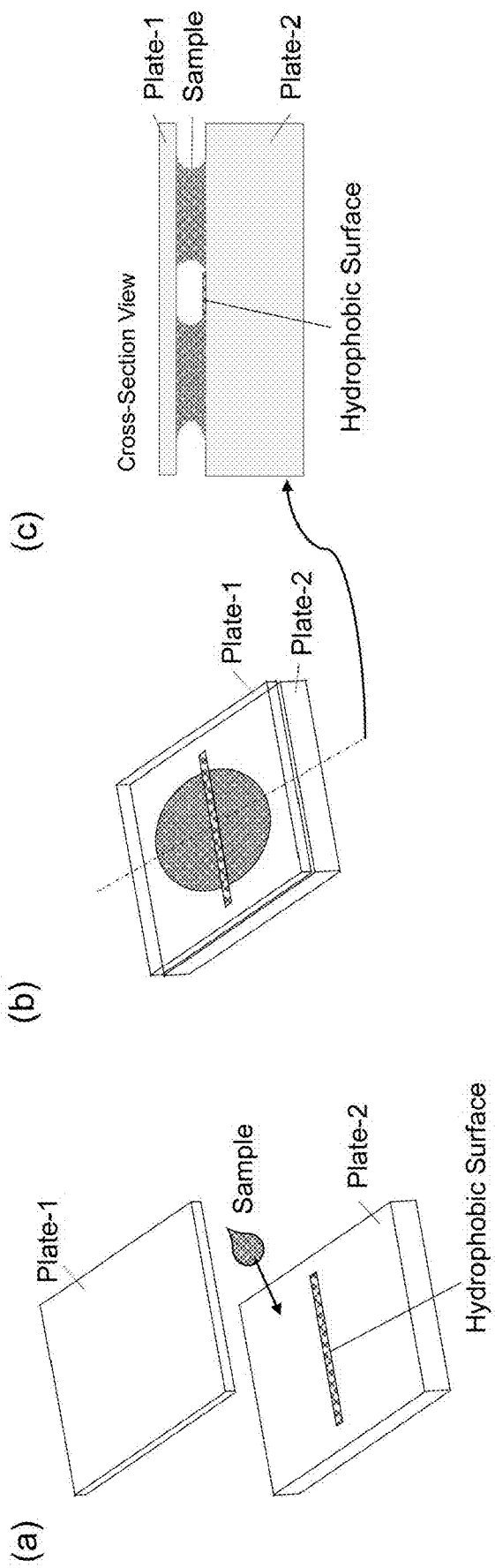
FIG. 2 is an example device with a separation coating: (a) shows a perspective view of a device with two plates and separation coating (e.g., a hydrophobic surface) on one of the plates; (b) shows a perspective view of the sample between the two plates, separated by separation coating on one of the plates; and (c) shows a cross-section view of the device of (b) with a sample between the two plates, separated by hydrophobic separation coating on one of the plates.

FIG. 2 is an example device with a separation coating: (a) shows a perspective view of a device with two plates and separation coating (e.g., a hydrophobic surface) on one of the plates; (b) shows a perspective view of the sample between the two plates, separated by separation coating on one of the plates; and (c) shows a cross-section view of the device of (b) with a sample between the two plates, separated by hydrophobic separation coating on one of the plates.

In some embodiments, the separation structure includes but is not limited to a trench and holes.

In some embodiments, the separation structure includes but is not limited to walls and pillars.

In some embodiments, the shape of the separation structure is selected from line, round, polygonal, circular, square, rectangular, oval, elliptical, or any combination of the same.

In some embodiments, one lateral dimension of the separation structure is 50 um, 100 um, 200 um, 500 um, 1 mm, 2 mm, 3 mm, 5 mm, 10 mm, or in a range between any of the two values.

In some embodiments, one vertical dimension of the separation structure is 50 um, 100 um, 200 um, 500 um, 800 um, 1 mm, or in a range between any of the two values.

The working principle of a wall and pillars are direct liquid blocking and separation by physical structures.

The working principle of using a trench for separating liquid is by capillary pressure difference between the liquid inside the trench and the liquid on top of the trench in the gap. In more detail, if a part of the trench is not filled up, the capillary pressure at the liquid inside the trench is related to the surface tension at the trench and the size of the trench, while the capillary force on top the trench is related to the liquid surface tension in the gap and size of the gap. If the second pressure is larger than the first, the liquid will be pumped out from the trench, thus creating a separation gap in the trench as shown in FIG. 1 (c).

In certain embodiments, due to above mechanism, the liquid will not go into the trench when closing the device or is being sucked into the device.

In certain embodiments, the liquid is not fully filled up with trench after applying the sample into the device.

In some embodiments, the separation coatings can include but is not limited to hydrophobic coatings.

In some embodiments, the separation coating can include but is not limited to ionic and/or non-ionic coatings.

In some embodiments, the separation coating can include but is not limited to the chemicals such as trichloro (1H, 1H, 2H, 2H-perfluorooctyl) silane, alkanes, oils, fats, and greasy substances.

In some embodiment, a coating is on at least one interior opposing surface of at least one of the plates, or both.

In some embodiment, instead of hydrophobic coating inside the separation area, the coating can be on sample area with hydrophilic treatment, including but not limit to dielectric material coating, silicon oxide coating, plasma treatment, ozone treatment, polymer coating, acid-base treatment, surfactant chemical coating. In this case, the wetting angle at one interior surface is 10°, 20°, 30°, 45°, 60°, 75° or in a range between any of these values.

In some embodiments, the shape of the separation coating is selected from line, round, polygonal, circular, square, rectangular, oval, elliptical, or any combination of the same.

In some embodiments, one lateral dimension of the separation coating is, for example, 100 um, 200 um, 500 um, 1 mm, 2 mm, 3 mm, 5 mm, 10 mm or in a range between any of the two values.

Figure 3:
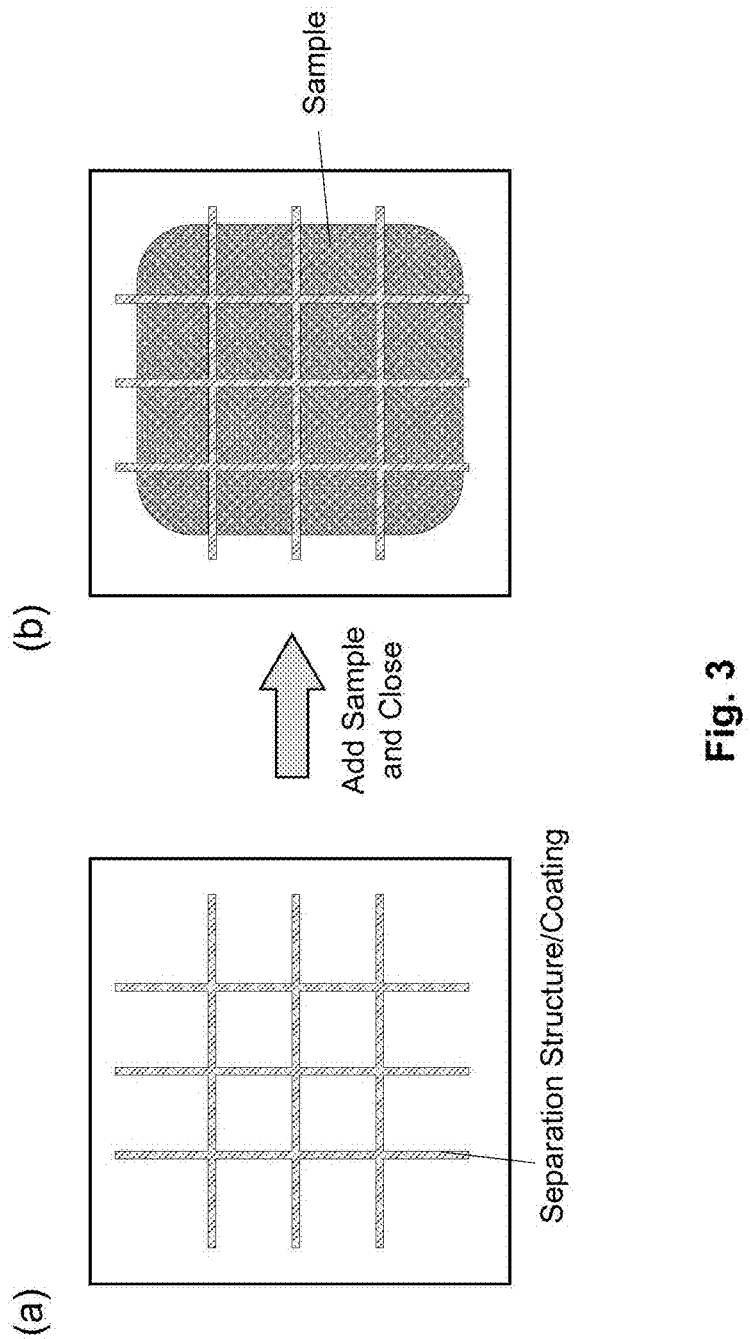
FIG. 3 shows an example device with a separation structure; (a) shows a top view of device with separation structure on one of the plates; and (b) shows the top view of the device after adding the sample and closing with a second plate. The sample is self-separated into separated areas.

FIG. 3 shows an example device with a separation structure; (a) shows a top view of device with separation structure on one of the plates; and (b) shows the top view of the device after adding the sample and closing with a second plate. The sample is self-separated into separated areas.

In some embodiments, the lateral dimension of each separated area is 50 um, 100 um, 200 um, 500 um, 1 mm, 2 mm, 3 mm, 5 mm, 10 mm or in a range between any of the two values.

In some embodiments, the preferred lateral dimension of each separated area is 500 um, 1 mm, 2 mm, 3 mm, or in a range between any of the two values.

In some embodiments, the total area number in an size of 10 mm by 10 mm is 1, 2, 3, 5, 9, 16, 25, 36 or in a range between any of the two values.

In some embodiments, the disclosure provides a method for separating a liquid in the device, comprising:
(a) obtaining a liquid sample;
(b) obtaining a device in above disclosure;
(c) depositing the sample on one or both of the plates when the plates are configured in the open configuration,
(d) after (c), forcing the two plates into a closed configuration; and the liquid is separated into parts by separation structure or coating in the device.

In some embodiments, the disclosure provides a method for separating liquid in the device, comprising:
(a) obtaining a liquid sample;
(b) obtaining a device in above disclosure in closed configuration;
(c) depositing the sample on side the plates,
(d) after (c), the liquid is sucked into the device and separated into parts by separation structure or coating in the device.

In certain embodiment, the separation structure is combined with a separation coating on the surface of the device. For example, a separation trench can be further treated into hydrophobic surface inside the trench to enhance the separation effect.

In certain embodiment, the assay performed at each separated area includes but not limit to colorimetric assay, immunoassay, nucleic acid hybridization assay, turbidity assay, cell counting assay, cell staining assay and others.

In certain embodiment, different assay type is performed in different separated areas of the device.

Example 1. Device with Separation Structures

Figure 4:
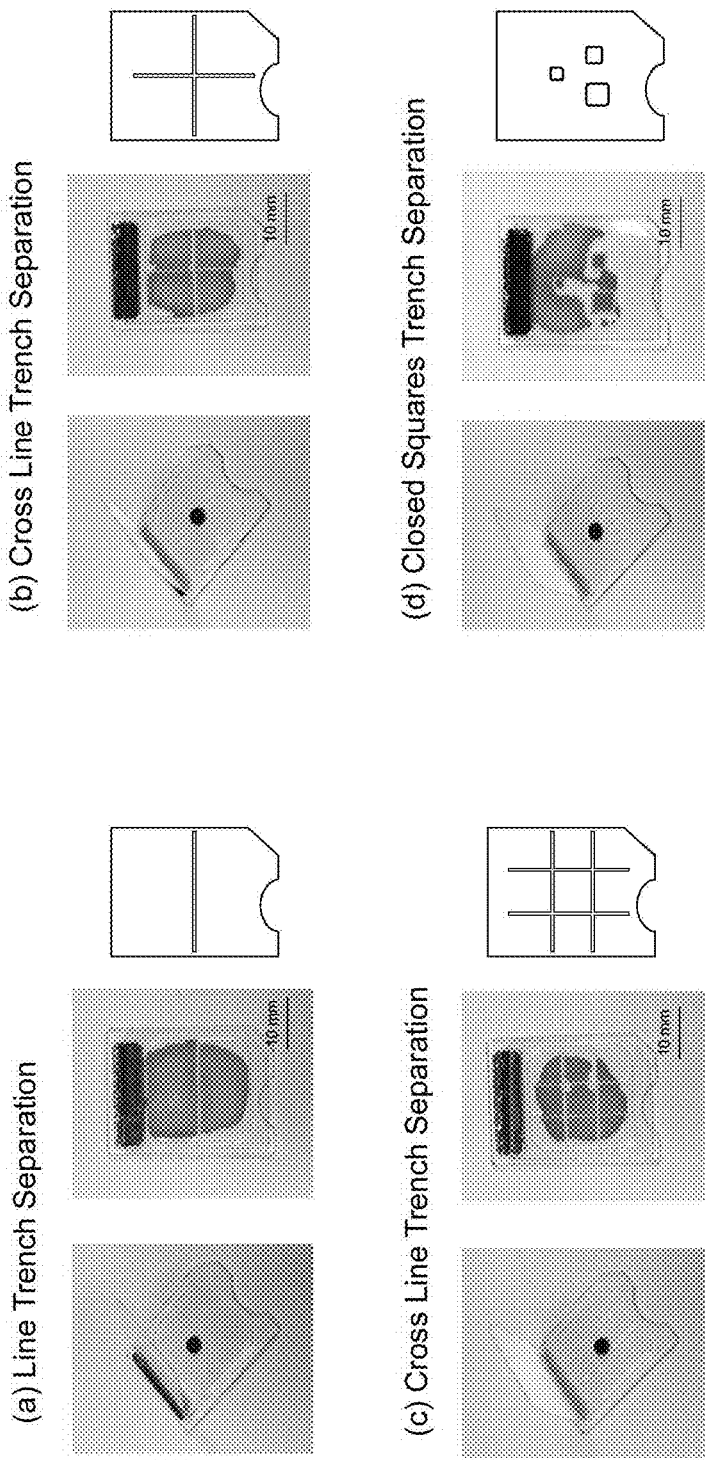
FIG. 4 shows example devices with separation structures used in actual experiments: (a) shows a device with two plates and a line trench separation structure on the bottom plate (left), and after closing, the liquid is separated into two parts by the structure (right); (b) shows a device with two plates and cross line trench separation structure on the bottom plate (left), and after closing, the liquid is separated into four parts by the structure (right); (c) shows a device with two plates and cross line trench separation structure on the bottom plate (left), and after closing, the liquid is separated into nine parts by the structure (right); and (d) shows a device with two plates and three closed square shape trench separation structures on the bottom plate (left), and after closing, the liquid is separated into three separated square by the structure (right).

FIG. 4 are example devices with separation structures in experiments. (a) shows a device with two plates and a line trench separation structure on the bottom plate. After closing, the liquid is separated into two parts by the structure. (b) shows a device with two plates and cross line trench separation structure on the bottom plate. After closing, the liquid is separated into four parts by the structure. (c) shows a device with two plates and cross line trench separation structure on the bottom plate. After closing, the liquid is separated into nine parts by the structure. (d) shows a device with two plates and 3 closed square shape trench separation structure on the bottom plate. After closing, the liquid is separated into 3 separated square by the structure.

In above example, the thickness of one plate of Q-Card is around 120 um micrometer) to 200 um. The thickness of one plate of Q-Card is around 0.5 mm to 1.5 mm.

In above example, the gap of Q-Card is around 10 um to 50 um.

In above example, the width of line trench is around 300 um to 1 mm.

In above example, the depth of trench is around 100 um to 500 um.

In above example, the sample volume is around 1 uL (microliter) to 15 uL.

In above example, the trench is fabricated by laser cutting.

In above example FIG. 4(d), the closed square shape has a size, for example, around 1 mm, 3 mm and 5 mm.

In above example, the sample is whole blood.

In above example, the sample is dropped near the separation structure by 1 mm to 3 mm.

Example 2. Device with Separation Coatings

Figure 5:
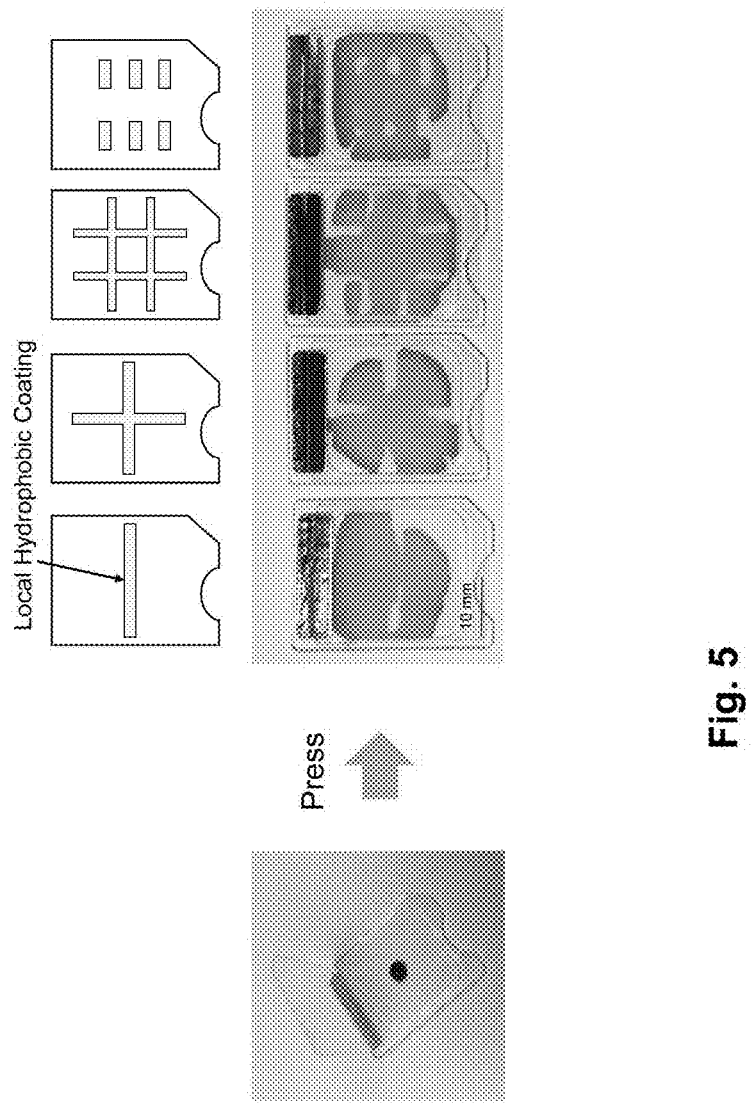
FIG. 5 shows example devices with separation coatings used in actual experiments. The devices can have separation coatings as lines, cross-bars, and separated bars on one of the plates. After closing with a second plate, the liquid is separated by the separation coatings on the surface.

FIG. 5 are example devices with separation coatings in experiments. The devices have separation coatings as lines, cross bars and separated bars on one of the plates. After closing, the liquid is separated by the separation coatings.

In above example, the thickness of one plate of Q-Card is around 120 um to 200 um. The thickness of one plate of Q-Card is around 0.5 mm to 1.5 mm.

In above example, the gap of Q-Card is around 10 um to 50 um.

In above example, the hydrophobic coating is by hydrophobic barrier PAP pen or liquid block pen.

In above example, the width of line coating is around 500 um to 3 mm.

In above example, the sample volume is around 1 uL to 15 uL.

In above example, the sample is whole blood.

In above example, the sample is dropped near the separation coating by 1 mm to 3 mm.

The present invention has been described with reference to various specific embodiments and techniques. However, many other variations and modifications are possible while remaining within the disclosed scope.

Multiplexing with Well Q-Card

A device for liquid sample collection and liquid sample analysis, comprising:
 a base plate having: at least one well area in at least a portion of a sample image area,
 a cover plate that opposes the base plate, the cover plate covers at least a portion of the well area and at least a portion of the sample image area on the base plate;
 at least one reagent inside one well;
wherein the opposed base plate and the cover plate define an interior cavity.

In certain embodiments, the device comprises a first plate, a second plate, and disclosed well structures.

In certain embodiments, one or both of the plates comprise well structures fixed on the inner surface of a respective plate.

In certain embodiments, one or both of the plates further comprise a spacer fixed on the inner surface of a respective plate.

In certain embodiments, at least part of the well structure is inside the sample contact area.

In certain embodiments, the two plates of the device are initially on top of each other and need to be separated to get into an open configuration for sample deposition.

In certain embodiments, the well structure needs to be fully filled with sample before the QMAX in closed configuration.

The term "open configuration" of the two plates in a QMAX process means a configuration in which the two plates are either partially or completely separated apart and the spacing between the plates is not regulated by the spacers. The term "closed configuration" of the two plates in a QMAX process means a configuration in which the plates are facing each other, the spacers and a relevant volume of the sample are between the plates, the relevant spacing between the plates, and thus the thickness of the relevant volume of the sample, is regulated by the plates and the spacers, wherein the relevant volume is at least a portion of an entire volume of the sample.

The well structure and card can be fabricated by mechanical drilling, injection molding, 3D printing, imprinting and others.

The bottom base of the well can be fabricated together with well, or combined together with another plate or film as shown in example of FIG. 9(a).

Figure 6:
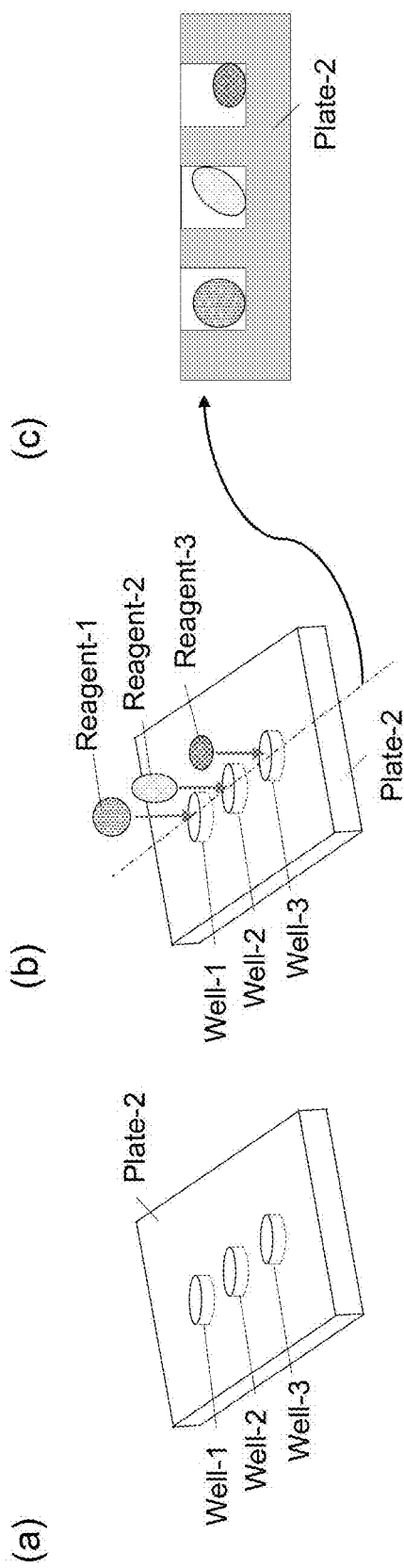
FIG. 6 shows an example device with 3 well structures and 3 reagents for multiplexing assay: (a) shows a plate with 3 wells on it; (b) shows 3 reagents in solid phase dropping into 3 wells; and (c) shows a cross-section view of the plates with 3 well structures and 3 reagents for a multiplexing assay in each of the 3 wells.

Referring to the Figures, FIG. 6 is an example device with 3 well structures and 3 reagents for multiplexing. (a) shows a plate with 3 wells on it; (b) shows 3 reagents in solid phase dropping into 3 wells. (c) shows the cross-section view of the plates with 3 well structures and 3 reagents for multiplexing in each of 3 wells.

The shape of the well structure is selected from line, round, polygonal, circular, square, rectangular, oval, elliptical, or any combination of the same.

The preferred shape of the well structure is round and rectangular.

One lateral dimension of the well structure is 50 um, 100 um, 200 um, 500 um, 1 mm, 2 mm, 3 mm, 5 mm, 10 mm or in a range between any of the two values.

One preferred lateral dimension of the well structure is 500 um, 1 mm, 2 mm, 3 mm, or in a range between any of the two values.

One vertical dimension of the well structure is 50 um, 100 um, 200 um, 500 um, 800 um, 1 mm, 2 mm or in a range between any of the two values.

In certain embodiments, the well to well edge distance is 100 um, 200 um, 500 um, 800 um, 1 mm, 2 mm, 3 mm, 5 mm, 10 mm or in a range between any of the two values.

In certain embodiments, the preferred well to well edge distance is 200 um, 500 um, 800 um, 1 mm, 2 mm, or in a range between any of the two values.

In certain embodiments, there is preferred 1, 2, 3, 4, 5, 6, 8, 9 wells in an area size of 4 mm by 5 mm.

In certain embodiments, the reagent is in a solid pill shape before dropping into the well.

In certain embodiments, the solid pill size is 200 um, 500 um, 800 um, 1 mm, 2 mm, 3 mm or in a range between any of the two values.

In certain embodiments, the preferred solid pill size is 500 um, 800 um, 1 mm, or in a range between any of the two values.

In certain embodiments, the reagent pill is coated with slow release reagent before dropping into the well.

In certain embodiments, the reagent is liquid in the well first, then dried in well.

In certain embodiments, the reagent is liquid in the well first, then lyophilized in well.

In certain embodiments, the reagent is coated on the side walls and bottom of well.

In certain embodiments, the reagent is forming net structure inside the well.

In certain embodiments, the reagent is forming or lyophilized into pill before dropping to the wells.

In certain embodiments, the reagents contains stabilizer including but not limit to suger, polymer, copolymer, ficoll, mannitol, surcrose, melezitose, BSA, trehalose, surfactant, zwittergent.

In certain embodiments, one device contains at least two wells, each well contains different reagents.

In certain embodiments, one device contains at least two wells, some wells contain the same reagents.

In certain embodiments, there is a separation structure or separation coating between two wells to forbid cross-reaction between wells.

In certain embodiments, the distance between wells is correlated to the assay time and analyte diffusion speed.

In certain embodiments, the wells are fully filled before the device in the closed configuration.

Figure 7:
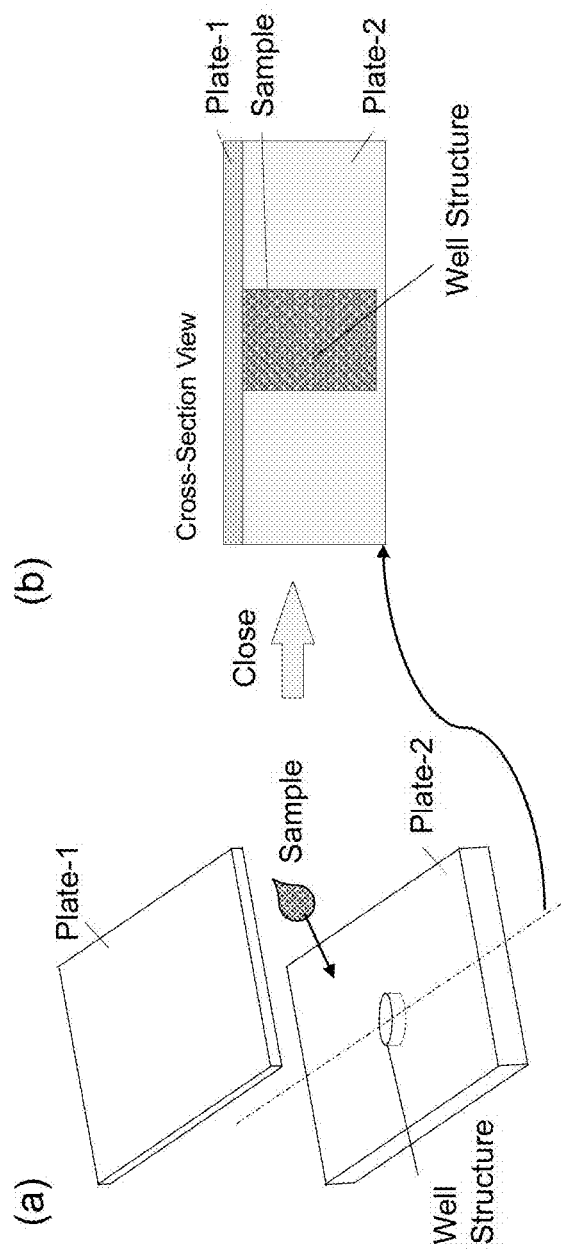
FIG. 7 shows an example device with well structure: (a) shows a device with two plates and well structure on one of the plates. A sample is added between the two plate onto the well structure; and (b) shows the cross-section view of the device with a sample between the two plates inside the well structure in Plate-2.

FIG. 7 is an example device with well structure: (a) shows a device with two plates and well structure on one of the plates. Sample is added between the two plate onto the well structure; and (b) shows the cross-section view of the device with sample between the two plates inside the well structure on Plate-2.

Figure 8:
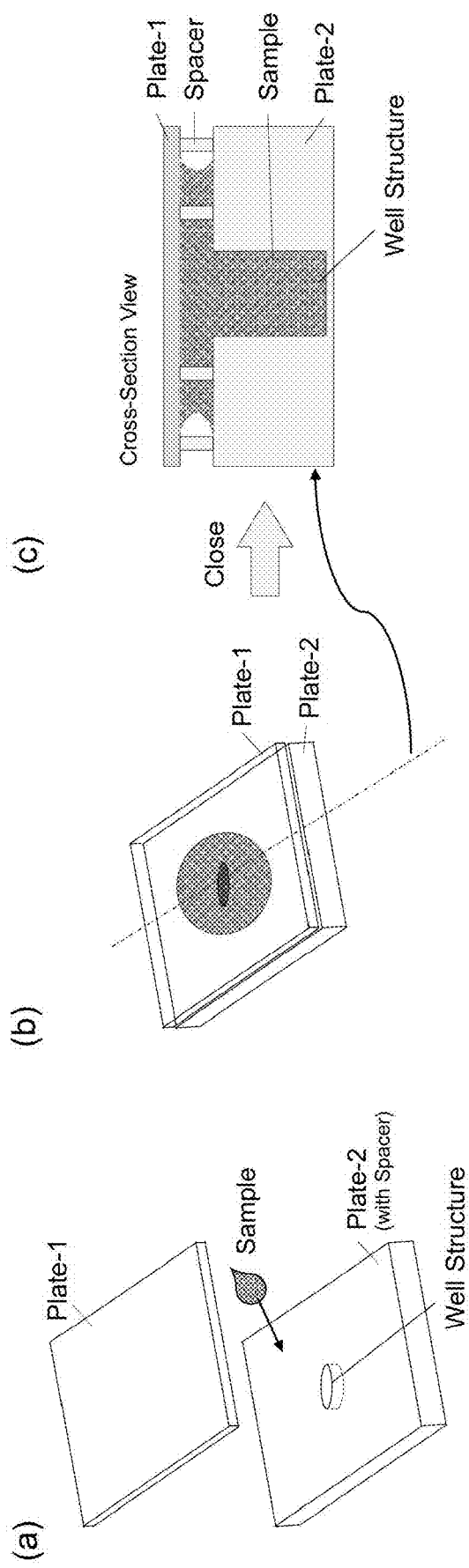
FIG. 8 shows an example device with a well structure and spacers: (a) shows a device with two plates, well structure and spacer on one of the plates, and a sample is added between the two plate onto or into the well structure; (b) shows a perspective view of the sample between the two plates; and (c) shows the cross-section view of the device with sample inside the well structure on Plate-2, and between the two plates supported by the spacers.

FIG. 8 is an example device with well structure and spacer: (a) shows a device with two plates, well structure and spacer on one of the plates. Sample is added between the two plate onto the well structure; (b) shows the tilt view of sample between the two plates; and (c) shows the cross-section view of the device with sample inside the well structure on the Plate-2, and between the two plates supported by the spacer.

The spacer structures between the two plates create a space above the well structure, which can hold extra liquid that is more than the volume of well structure.

In certain embodiments, the spacer structure self also serves as the optical reference structure for transmittance measurement.

In certain embodiments, the height of spacer is 1 um, 2 um, 5 um, 10 um, 20 um, 30 um, 50 um, 100 um, 200 um, or in a range between any of the two values.

In certain embodiments, the lateral dimension of spacer is 5 um, 10 um, 20 um, 30 um, 50 um, 100 um, 200 um, or in a range between any of the two values.

In certain embodiments, the disclosure provides a method for separating a liquid in the device, comprising:
  (a) obtaining a liquid sample;
  (b) obtaining a device in above disclosure;
  (c) depositing the sample on one or both of the plates when the plates are configured in the open configuration; and
  (d) after (c), forcing the two plates into a closed configuration; and the liquid is separated into different wells for different assay.

In certain embodiments, the disclosure provides a method for separating a liquid in the device, comprising:
  (a) obtaining a liquid sample;
  (b) obtaining a device in above disclosure in closed configuration;
  (c) depositing the sample on side the plates;
  (d) after (c), the liquid is sucked or drawn into the device, and the liquid is separated into different wells for different assay.

In certain embodiments, the assay performed at each well includes but not limit to colorimetric assay, immunoassay, nucleic acid hybridization assay, turbidity assay, cell counting assay, cell staining assay and others.

In certain embodiments, different assay type is performed in different wells of the device.

In certain embodiments of the present disclosure, the imaging process includes but not limit to bright field image with a broadband light (over 100 nm bandwidth), bright field image with a narrow band light (less than 100 nm bandwidth), fluorescence image.

In certain embodiments, both bright field image and fluorescence image are taken in the same area for comparison.

In certain embodiments, the fluorescence image has an excitation light at 450 nm to 500 nm, and an emission light at 500 nm to 550 nm and 600 nm to 700 nm.

In certain embodiments, the fluorescence image has an excitation light at 475 nm, and an emission light at both 525 nm and 650 nm.

In certain embodiments, the analysis of image of the well includes a separated analysis of the same in R, G, B channel.

In certain embodiments, the analysis of image of the well includes a signal intensity comparison of well area, or some points inside well area with some points outside well area as reference.

In certain embodiments, the reference area is in the pillar area outside the well area.

Example 3. Demonstration of Device and Method for Detecting Glucose Spiked in PBS Buffer In this example, the device has two plates. The bottom plate is made of acrylic, with one well in center with a depth of 1 mm and a size around 1.5 mm in diameter. The bottom of the well is sealed with a 50 um thick acrylic film. The above plate is a 175 um thick acrylic film with a pillar array on it. The pillar array has a period of 110 um, a pillar size of 30 um, and a pillar height of 30 um.

Figure 9:
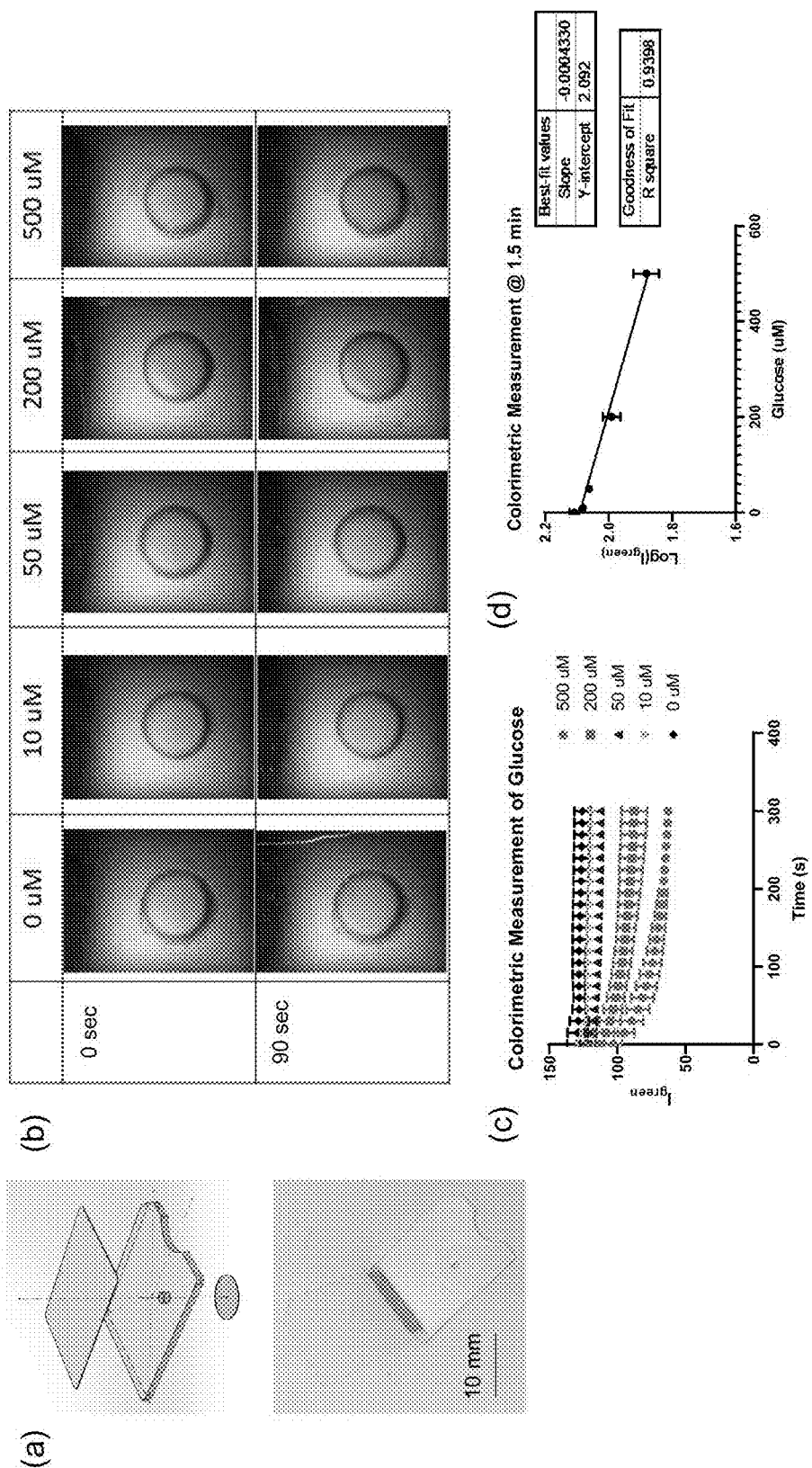
FIG. 9 shows an example of detecting a low concentration of glucose with the disclosed device: (a) shows an example schematic (top) and photo (below) of the device; (b) shows an example of captured well images at time 0 and at 1.5 minutes for various glucose concentration levels (i.e., 0 to 500 uM); (c) shows green channel intensity plotted over time after analyzing detection area; and (d) shows the Log of green channel intensity at 1.5 minutes plotted over glucose concentrations demonstrating a linear relationship and sensitivity less than 10 uM.

Detection of various glucose concentrations ranging from 0 to 500 uM in PBS was demonstrated in FIG. 9. Each well was coated with reagents that oxidize glucose molecules to generate hydrogen peroxide, which reacts with chromogen to generate a specific color in the well. The color intensity linearly corresponds to the amount of glucose in the well.

Materials:
  1. Imaging system with iPhone camera, external lens, and a custom-built mobile image capturing app ("ManuCam9.18.8b").
  2. Q-card with 1-mm thick well coated with a colorimetric assay reagent
  3. Glucose spiked in PBS buffer Methods:
  1. Prepare the following reagent mixture

|  | Stock Concentration | Volume (uL) |
|---|---|---|
| GO | 2 kU/mL | 15 |
| HRP | 2 kU/mL | 15 |
| 4-AAP | 40 mg/ml | 10 |
| TOOS | 130.94 mg/mL | 10 |
| Total |  | 50 |

2. Deposit 1 to 2 uL of reagent mixture onto the well and air-dry reagent for about 30 minutes 3. Prepare the following glucose sample dilutions in PBS

| Sample ID | Concentration (uM) |
|---|---|
| D0 | 4607 |
| D1 | 500 |
| D2 | 200 |
| D3 | 50 |
| D4 | 10 |
| D5 | 0 |

| Source | Glucose Stock Volume (uL) | PBS Volume (uL) |
|---|---|---|
| D0 | 10.85 | 89.15 |
| D1 | 40 | 60 |
| D2 | 25 | 75 |
| D3 | 20 | 80 |
| D4 | 0 | 100 |

4. Deposit 10 uL of glucose sample dilution onto Q-card and capture images using iPhone and iMOST adapter. Capture an image every 15 seconds for 5 minutes
   ISO: 40
   Speed: 30
   Temperature: 5,000K Results:
1. Glucose reacts with enzymes coated on the well and generates chromogen that absorbs green color light and therefore shows red color. The signal is average intensity of the green channel inside the well.
2. FIG. 9 demonstrates an example performance of detecting glucose spiked in PBS buffer. As illustrated in FIG. 9b, green channel intensity becomes saturated after 3 minutes, and there is a linear relationship between log of green channel intensity versus glucose concentration from 0-500 uM. The system generated $R^2=0.9723$.

Example 4. Demonstration of Device and Method for Multiplexed Detection

Figure 10:
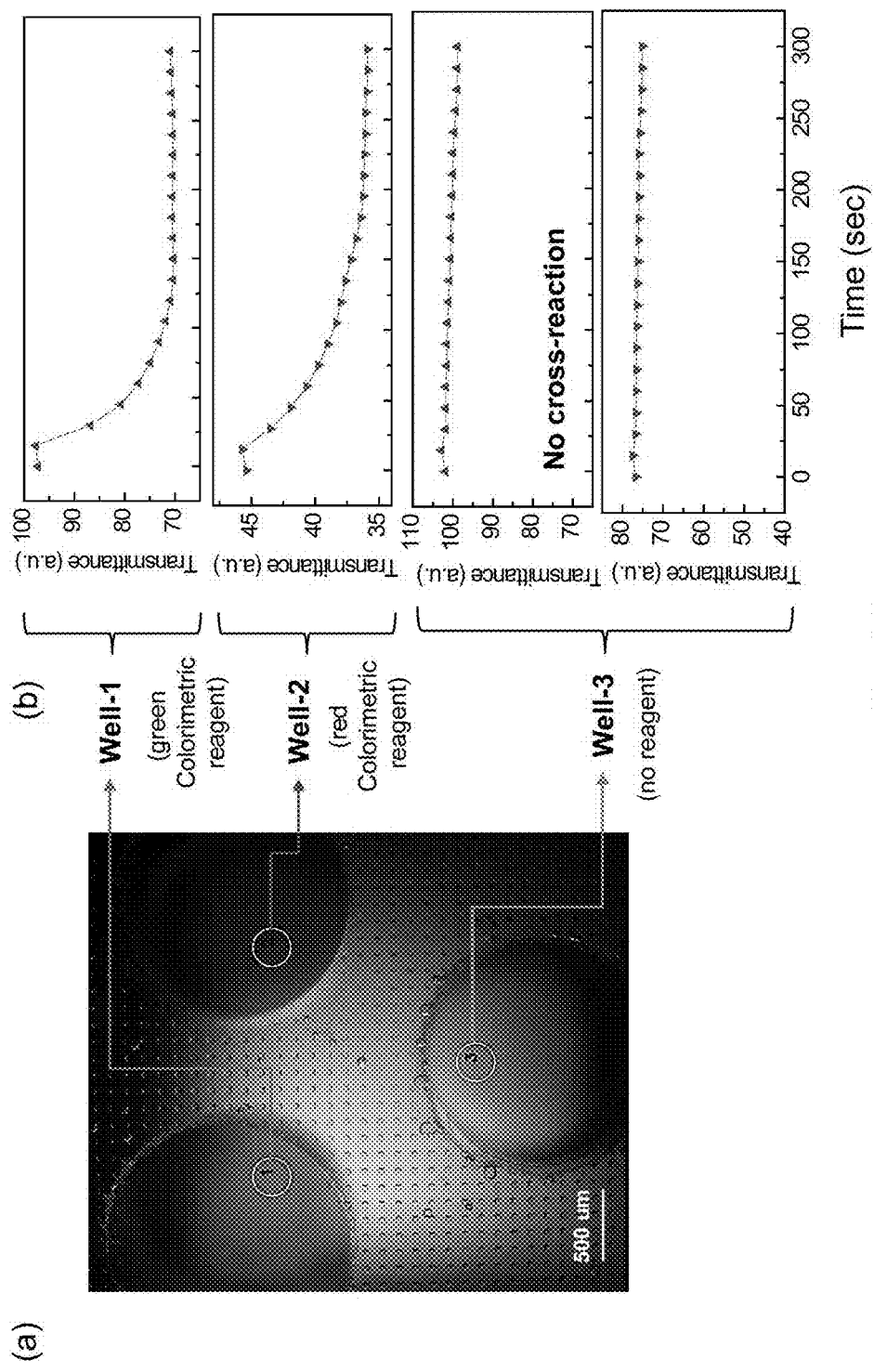
FIG. 10 shows an example of multiplexed detection using the disclosed multi-well structure: (a) shows an example of captured images at time 5 minutes after adding 3 uL of 4,500 uM glucose into each well; and (b) graphs show Red, Green, and Blue channel intensities measured over time in the three wells, where the blank well has neither red or green development, meaning no cross-reaction between wells for at least 5 minutes.

Simultaneous detection of glucose in two distinct colors (blue and red) was demonstrated in FIG. 10. Three wells were fabricated per Q-card, where one of the wells was coated with a reagent that oxidizes glucose molecule to generate hydrogen peroxide and reacts with TOOS and 4-AAP to generate a red color signal in the well. Another well was coated with a reagent that contains MAOS and 4-AAP to react with hydrogen peroxide, and generates a blue color in the well. Distinct colors were maintained in each well over 5 minutes period, without signal spillover to nearby wells.

In this example, the device has two plates. The bottom plate is made of acrylic, with 3 wells in center with a depth of 1 mm, a size around 1.5 mm in diameter and a well to well distance around 0.7 mm. The bottom of the well is sealed with a 50 um thick acrylic film. The above plate is a 175 um thick acrylic film with a pillar array on it. The pillar array has a period of 110 um, a pillar size of 30 um, and a pillar height of 30 um.

Materials:
1. Imaging system with iPhone camera, external lens, and a custom-built mobile image capturing app ("ManuCam9.18.8b").
2. Q-card with 1-mm thick wells coated with colorimetric assay reagents
3. Glucose spiked in PBS buffer Methods:
1. Prepare the following reagent mixtures "Red" Reagent Mixture

|  | Stock Concentration | Volume (uL) |
|---|---|---|
| GO | 2 kU/mL | 15 |
| HRP | 2 kU/mL | 15 |
| 4-AAP | 40 mg/mL | 10 |
| TOOS | 130.94 mg/mL | 10 |
| Total |  | 50 |

"Blue" Reagent Mixture

|  | Stock Concentration | Volume (uL) |
|---|---|---|
| GO | 2 kU/mL | 15 |
| HRP | 2 kU/mL | 15 |
| 4-AAP | 40 mg/mL | 10 |
| MAOS | 130.94 mg/mL | 10 |
| Total |  | 50 |

2. Deposit 1 to 2 uL of reagent mixture onto the well as shown in FIG. 10a and air-dry reagents for about 30 minutes
3. Prepare about 4500 uM glucose in PBS buffer
4. Deposit 3 uL of glucose solution into all three wells, and capture images using iPhone and iMOST adapter Capture an image every 15 seconds for 5 minutes
   ISO: 40
   Speed: 30
   Temperature: 5,000K Results:
1. Glucose reacts with enzymes coated on the wells and generates chromogen that absorbs green or red color lights and therefore showing red or blue colors respectively.
2. FIG. 10 demonstrates an example performance of detecting glucose spiked in PBS buffer in two colors simultaneously. As shown in FIG. 10b, each well generated correct signal without reagents spilling-over to the nearby wells. Well-1 shows the average intensity at green channel increase with time (transmittance decrease with time). Well-2 shows the average intensity at red channel increase with time (transmittance decrease with time). Well-3 is not influenced by the cross-leakage of reagents from both Well-1 and Well-2.

FIG. 10b also demonstrate minimal cross-reactivity in each well.

Each of the individual embodiments described and illustrated herein has discrete components and features which can be readily separated from or combined with the features of any of the other several embodiments without departing from the present teachings. Any recited method can be carried out in the order of events recited or in any other order which is logically possible. A skilled artisan will appreciate that the present invention is not limited in its application to the details of construction, the arrangements of components, category selections, weightings, pre-determined signal limits, or the steps set forth in the description or drawings.

The terms describing the disclosed devices/apparatus, systems, and methods, are defined in the current application or, for example: in PCT Application (designating U.S.) Nos. PCT/US2016/046437 and PCT/US2016/051775, filed Aug. 10, 2016 and Sep. 14, 2016, respectively; and U.S. Provisional Application No. 62/456,065, filed Feb. 7, 2017; 62/456,287, filed Feb. 8, 2017; and 62/456,504, filed Feb. 8, 2017, all incorporated in this application in their entirety.

A "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are in the abovementioned U.S. Provisional Application No. 62/456,065. "CROF" is an acronym describing a sample card having two opposing plates and separating spacers, and the following attributes: "Compressed (i.e., by a force), Regulated (i.e., plate separation and sample layer thickness), and Open Flow (i.e., of a liquid or sample within the opposed plates).

QMAX System

A) QMAX Card

Details of the QMAX card are described in detail in a variety of publications including the abovementioned PCT/US2016/046437, which is entirely incorporated here by reference.

I. Plates

In present invention, generally, the plates of CROF are made of any material that (i) is capable of being used to regulate, together with the spacers, the thickness of a portion or entire volume of the sample, and (ii) has no significant adverse effects to a sample, an assay, or a goal that the plates intend to accomplish. However, in certain embodiments, particular materials and their properties are selected for the plate to achieve certain objectives.

In certain embodiments, the two plates can have the same or different parameters for each of the following plate parameters: construction material, thickness, shape, area, flexibility, surface property, and optical transparency.

(i) Plate Materials. The plates can be made of, for example, a single material, composite materials, multiple materials, multi-layers of materials, alloys, or a combination thereof. Each of the materials for the plate can be, for example, an inorganic material, an organic material, or a mixture thereof. The plate material(s) is preferably compatible with other structural materials or assay materials such as a plate coating, a sample, a liquid, a diluent, a solvent, an analytes, and like substances. A significant physical property of the selected construction material for the plate having spacers is flowability under heat, pressure, or both. Examples of flowable materials include: inorganic materials such glass, quartz, oxides, silicon-dioxide, silicon-nitride, hafnium oxide (HfO), aluminum oxide (AlO), semiconductors (e.g., silicon, GaAs, GaN), metals (e.g., gold, silver, coper, aluminum, Ti, Ni), ceramics, or any flowable combination thereof, organic materials such as polymers (e.g., plastics) or amorphous organic materials. The polymers can include, for example, an acrylate, vinyl, olefin, cellulosic, non-cellulosic, polyester, polyamide (PA) (e.g., Nylon), cyclic olefin copolymer (COC), poly(methyl methacrylate) (PMMA), polycarbonate (PC), cyclic olefin polymer (COP), liquid crystalline polymer (LCP), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFA), polydimethylsiloxane (PDMS), natural or synthetic rubber, or a combination thereof, or a compatible mixture of inorganic and organic materials.

In certain embodiments, the plates are each independently made of at least one of glass, plastic, ceramic, or metal. In certain embodiments, each plate independently includes at least one of glass, plastic, ceramic, or metal. In certain embodiments, one plate can be different from the other plate in, for example, lateral area, thickness, shape, materials, or surface treatment. In certain embodiments, one plate can be the same as the other plate in lateral area, thickness, shape, construction materials, or surface treatment.

The materials for the plates can be rigid, flexible, or any flexibility between the two. The rigidity (i.e., stiffness) or flexibility is relative to a given pressing force used in bringing the plates into a closed configuration.

In certain embodiments, a selection of rigid or flexible plate can be determined from the requirements of controlling a uniformity of the sample thickness in a closed configuration.

In certain embodiments, at least one of the two plates can be transparent (e.g., to a light). In certain embodiments at least, a part or several parts of one plate or both plates can be transparent. In certain embodiments, the plates can be non-transparent or opaque.

(ii) Plate Thickness. In certain embodiments, the average thicknesses for at least one of the plates can be, for example, 2 nm or less, 10 nm or less, 100 nm or less, 500 nm or less, 1000 nm or less, 2 um (micron) or less, 5 um or less, 10 um or less, 20 um or less, 50 um or less, 100 um or less, 150 um or less, 200 um or less, 300 um or less, 500 um or less, 800 um or less, 1 mm (millimeter) or less, 2 mm or less, 3 mm or less, including intermediate values or ranges.

In certain embodiments, the average thicknesses for at least one of the plates are at most 3 mm (millimeter), at most 5 mm, at most 10 mm, at most 20 mm, at most 50 mm, at most 100 mm, at most 500 mm, including intermediate values or ranges.

In certain embodiments, the thickness of a plate is not uniform across the plate. Using a different plate thickness at a different location can be used to control the plate bending, folding, sample thickness regulation, and other characteristics.

(iii) Plate Shape and Area. Generally, the plates can have any shapes, as long as the shape allows for a compressed open flow of the sample and the regulation of the sample thickness (i.e., CROF). However, in certain embodiments, a particular shape can be advantageous. The shape of the plate can be, for example, round, square, elliptical, a rectangle, a triangle, a polygon, ring-shaped, or any superpositions of these shapes.

In certain embodiments, the two plates can have the same size or shape, or a different size or shape. The area of the plates can depend on the application. The area of the plate, on one side or both, can be, for example, 1 mm2 (square millimeters), 10 mm2, 100 mm2, 1 cm2 (square centimeters), 5 cm2, 10 cm2, 100 cm2, 500 cm2, 1000 cm2, 5000 cm2, 10,000 cm2, or over 10,000 cm2, including intermediate values or ranges.

In certain embodiments, at least one of the plates can be, for example, a belt (or strip) that has a width, thickness, and length. The width can be, for example, 0.1 cm (centimeter), 0.5 cm, 1 cm, 5 cm, 10 cm, 50 cm, 100 cm, 500 cm, 1000 cm, including intermediate values or ranges. The length can be as long as needed. The belt can be rolled into a roll.

(iv) Plate Surface Flatness. In many embodiments, an opposable inner surface of the plates can be, for example, flat or significantly flat, i.e., planar. In certain embodiments, the two opposable inner plate surfaces, in a closed configuration, can be, for example, parallel with each other. Flat inner surfaces facilitate a quantification, controlling of the sample thickness, or both, by simply using the predetermined spacer height in the closed configuration. For non-flat inner surfaces of the plate, one needs to know not only the spacer height, but also the exact the topology of the inner surface to quantify, to control the sample thickness, or both, in the closed configuration. To know the surface topology one needs additional measurements, corrections, or both, which can be complex, time consuming, and costly.

A flatness of the plate surface relative to the final thickness (i.e., the sample thickness in a two-plate closed configuration), can be characterized by the term "relative surface flatness," which is the ratio of the plate surface flatness variation to the final sample thickness.

In certain embodiments, the relative surface flatness, can be, for example, less than 0.01%, 0.1%, less than 0.5%, less than 1%, less than 2%, less than 5%, less than 10%, less than 20%, less than 30%, less than 50%, less than 70%, less than 80%, less than 100%, including intermediate values or ranges.

(v) Plate Surface Parallelism. In certain embodiments, the two opposable surfaces of a plate can be substantially parallel to each other. In certain embodiments, the two opposable surfaces of the plate are not parallel to each other.

(vi) Plate Flexibility. In certain embodiments, a plate can be flexible under compression of a CROF process. In certain embodiments, both plates are flexible under compression of a CROF process. In certain embodiments, one plate is rigid and another plate is flexible (i.e., bendable without breaking), resilient (i.e., capable of recoiling or springing back into an original shape after applying, e.g., a bending, stretching, or compressing force), or both, under the compression force of a plate member in a CROF process. In certain embodiments, both plates can be rigid. In certain embodiments, both plates can be flexible, resilient, or both, but can have different degrees of flexibility or resiliency.

(vii) Plate Optical Transparency. In certain embodiments, a plate can be optically transparent. In certain embodiments, both plates can be optically transparent. In certain embodiments, one plate can be optically transparent and another plate can be optically opaque. In certain embodiments, both plates can be opaque. In certain embodiments, both plates can be optically transparent but can have different degrees of optical transparency. The optical transparency of a plate refers to a portion or the entire area of the plate.

(viii) Surface Wetting Properties. In certain embodiments, a plate can have an inner surface that wets (i.e., contact angle is less 90 degree) with application of the sample, the transfer liquid, or both. In certain embodiments, both plates can have an inner surface that wets with application of the sample, the transfer liquid, or both; either sample or liquid having the same or different wettability. In certain embodiments, a plate can have an inner surface that wets with application of the sample, the transfer liquid, or both; and another plate has an inner surface that does not wet (e.g., the contact angle equal to or larger than 90 degree). The wetting of a plate inner surface can refer to a portion or the entire inner surface area of the plate.

In certain embodiments, the inner surface of the plate can have other nano- or microstructures to control a lateral flow of a sample during a CROF process. The nano- or microstructures can include, for example, channels, vias, bumps, and like structures. Nano- and microstructures can also be used to control the wetting properties of an inner surface.

II. Spacers (i) Spacer Function. The spacers can be configured to have one or any combination of the following functions and properties: (1) control, together with the plates, the thickness of the sample or a relevant volume of the sample (preferably, the thickness control is precise, uniform, or both, over a relevant area); (2) allow the sample to have a compressed regulated open-flow ("CROF") on plate surface; (3) not occupy significant surface area (volume) in a given sample area (volume); (4) reduce or increase the effect of sedimentation of particles or analytes in the sample; (5) change, control, or both, the wetting properties of the inner surface of the plates; (6) identify a location of the plate, a scale of size, information related to a plate, or a combination thereof, or (7) any combination of the above.

(ii) Spacer Architectures and Shapes. To achieve desired sample thickness reduction and control, in certain embodiments, the spacers can be fixed to its respective plate. In general, the spacer can have any shape, as long as the spacers are capable of regulating the sample thickness during a CROF process, but certain shapes are preferred to achieve certain functions, such as better uniformity, less overshoot in pressing, and like considerations.

The spacer(s) can be a single spacer or a plurality of spacers (e.g., an array). Certain embodiments of a plurality of spacers can have, for example, an array of spacers (e.g., pillars), where the inter-spacer distance (ISD) is periodic or aperiodic, or is periodic or aperiodic in certain areas of the plates, or has different distances in different areas of the plates.

In an embodiment, there can be two kinds of the spacers: open-spacers and enclosed-spacers. The open-spacer is the spacer that allows a sample to flow through the spacer (i.e., the sample flows around and past the spacer, for example, a post as the spacer. The enclosed spacer is the spacer that stops sample flow (i.e., the sample cannot flow beyond the spacer), for example, a ring-shaped spacer and a sample is inside the ring. Both types of spacers can use their height to regulate the final sample thickness at a closed configuration.

In certain embodiments, the spacers can be, for example: open-spacers only; enclosed-spacers only; or a combination of open-spacers and enclosed-spacers.

"Pillar spacer" refers to a spacer having a pillar shape and the pillar shape can refer to an object that has a height and a lateral shape that allows a sample to flow around it during a compressed open flow.

In certain embodiments, the lateral shapes (i.e., the cross sectional geometry in a plane parallel to a plate) of the pillar spacers can be selected from the groups: (i) round, elliptical, rectangular, triangular, polygonal, ring-shaped, star-shaped, letter-shaped (e.g., L-shaped, C-shaped, and like letter shapes from A to Z), or number shaped (e.g., shapes such as 0 1, 2, 3, 4, . . . to 9); (ii) a shape having at least one rounded corner; (iii) a shape having zig-zag or rough edges; or (iv) any superposition or combination of shapes (i) to (iii). For multiple spacers, different spacers can have different lateral shapes and sizes, and different distances from the neighboring spacers.

In certain embodiments, the spacer structure can include, for example, a post, a column, a bead, a sphere, or other suitable geometries that can be formed in an imprinting mold process. The lateral shape and dimension (i.e., perpendicular or normal to the respective plate surface) of the spacers can be anything, except, in certain embodiments, the following restrictions can apply: (i) the spacer geometry does not cause a significant error in measuring the sample thickness and volume; or (ii) the spacer geometry does not prevent the out-flowing of the sample between the plates (i.e., the plate is not in an enclosed form). In certain embodiments, the plate can have, for example, some spacers that are closed spacers that can restrict sample flow.

In certain embodiments, the shapes of the spacers have rounded corners. For example, a rectangle shaped spacer has one, several, or all corners rounded (e.g., resembling a circle rather than 90° angles). A round corner can often make a fabrication of the spacer easier, and in some instances cause less damage to a biological sample or specimen when in use.

The sidewall of the pillars can be, for example, straight, curved, sloped, or have a different shape in different sections of a selected sidewall. In certain embodiments, the spacers can be, for example, pillars of various lateral shapes, sidewalls, and pillar-height to pillar-lateral area ratio. In a preferred embodiment, the spacers can have pillar shapes the permit open-flow of the sample such as in a CROF process.

(iii) Spacer Material. The spacers can be made of any material that is capable of being used to regulate, together with the two plates, the thickness of a relevant volume of the sample. In certain embodiments, the spacer material can be different from plate material. In certain embodiments, some spacer material can be the same as a portion of the material for at least one plate.

The spacers can be made of, for example, a single material, composite materials, multiple materials, multiple layers of a material, an alloy, or a combination thereof. Each of the materials for the spacer can be, for example, an inorganic material, an organic material, or a mixture thereof. Examples of the spacer materials are mentioned above. In a preferred embodiment, the spacers can be made of, for example, the same material as a plate used in a CROF process.

(iv) Spacer Mechanical Strength and Flexibility. In certain embodiments, the mechanical strength of the spacers can be strong enough, so that during the compression and in the closed configuration of the plates, the height of the spacers is the same or substantially the same as that when the plates are in an open configuration. In certain embodiments, the differences of the spacers in the open configuration and in the closed configuration can be characterized and established in advance.

The material for the spacers can be, for example, rigid, flexible, or any flexibility between the two. A rigid spacer is relative to a given pressing force used to bring the plates into the closed configuration. If the spacer does not deform greater than 1% in its height under the pressing force, the spacer material can be regarded as rigid, otherwise a flexible. When a spacer is made of flexible material, the final sample thickness at a closed configuration can still be established in advance from the pressing force and the mechanical property of the spacer. The material for the spacers can be selected to be resilient, i.e., flexible and also capable of substantially rebounding to an original shape when the pressing force is removed.

(v) Spacers Inside the Sample Area. To achieve desired sample thickness reduction and control, particularly to achieve a good sample thickness uniformity, in certain embodiments, the spacers can be placed, i.e., located, inside the sample area, or the relevant volume of the sample. In certain embodiments, there can be one or more spacers inside the sample area or the relevant volume of the sample on the plate or plate combination, and having a proper inter-spacer distance. In certain embodiments, at least one of the spacers can be inside the sample area, at least two of the spacers can be inside the sample area or the relevant volume of the sample, or at least "n" spacers inside the sample area or the relevant volume of the sample, where "n" can be determined by a sample thickness uniformity, or a required sample flow property during a CROF process.

(vi) Spacer Height. In certain embodiments, all spacers can have the same pre-determined height. In certain embodiments, spacers can have a different pre-determined height. In certain embodiments, spacers can be divided into groups or regions, wherein each group or region has its own spacer height. In certain embodiments, the predetermined height of the spacers can have an average height of the spacers. In certain embodiments, the spacers can have approximately the same height. In certain embodiments, a percentage of a number of the spacers can have the same height.

The height of the spacers can be selected by a desired regulated final sample thickness and the residue sample thickness. The spacer height (e.g., the predetermined spacer height) or the sample thickness can be, for example, 1 nm, 3 nm, 10 nm, 50 nm, 100 nm, 200 nm, 500 nm, 800 nm, 1000 nm, 1 um, 2 um, 3 um, 5 um, 10 um, 20 um, 30 um, 50 um, 100 um, 150 um, 200 um, 300 um, 500 um, 800 um, 1 mm, 2 mm, 4 mm, including any intermediate values or ranges.

The spacer height, sample thickness, or both, can be, for example, 1 nm to 100 nm in one preferred embodiment, 100 to 500 nm in another preferred embodiment, 500 to 1000 nm in a separate preferred embodiment, 1 (i.e., 1000 nm) to 2 um in another preferred embodiment, 2 to 3 um in a separate preferred embodiment, 3 to 5 um in another preferred embodiment, 5 to 10 um in a separate preferred embodiment, 10 to 50 um in another preferred embodiment, and 50 to 100 um in a separate preferred embodiment. The height or thickness preferences can be selected or applicable based on, for example, the expected dimensions of the analyte(s) in a sample, such as whole blood components, microorganisms, or environmental pollution particles.

In certain embodiments, the spacer height, the deposited sample thickness, or both, can be, for example: (i) equal to or slightly larger than the minimum dimension of an analyte; or (ii) equal to or slightly larger than the maximum dimension of an analyte. The "slightly larger" means that the spacer height, the sample thickness, or both, can be, for example, about 1 to 5% larger, including any intermediate values or ranges.

In certain embodiments, the spacer height, the sample thickness, or both, can be larger than the minimum dimension of an analyte, but less than the maximum dimension of the analyte (i.e., an analyte can have an anisotropic shape or aspect ratio). For example, a red blood cell has a disk shape with a minimum dimension of 2 um (disk thickness) and a maximum dimension of 11 um (disk diameter). The spacers can be selected to make the inner surface spacing of the plates (i.e., separation between the inner surfaces of the plates) in a relevant area to be 2 um (i.e., equal to the minimum dimension) in one embodiment, 2.2 um in another embodiment, or 3 (50% larger than the minimum dimension) in yet another embodiment, but less than the maximum dimension of the red blood cell. Such embodiment has certain advantages in blood cell counting. In one embodiment, for red blood cell counting, by making the inner surface spacing at 2 or 3 um, and any number between the two values, an undiluted whole blood sample can be confined in the spacing, on average, and each individual red blood cell (RBC) does not overlap with other RBCs, allowing an accurate counting of the RBCs visually or optically. Too many overlaps between the RBCs can cause serious errors in counting.

In certain embodiments, a card device uses the plates and the spacers to regulate not only a thickness of a sample, but also the orientation, surface density, or both, of the analytes or entity in the sample when the plates are in the closed configuration. When the plates are in a closed configuration, a thinner thickness of the sample gives fewer analytes or entities per surface area (i.e., less surface area concentration).

(vii) Spacer Lateral Dimension. For an open-spacer, the lateral dimensions can be characterized by spacer lateral dimension (alternatively called "width") in the x and y orthogonal directions. The lateral dimension of a spacer in each direction (x or y) can be the same or different.

In certain embodiments, the ratio of the lateral dimensions of the x to y direction can be, for example, 1, 1.5, 2, 5, 10, 100, 500, 1000, 10,000, including intermediate values or ranges. In certain embodiments, a different ratio can be used to regulate the sample flow direction; the larger the ratio, the flow is along one direction (i.e., a larger size direction).

In certain embodiments, the different lateral dimensions of the spacers in the x and y direction can be used for (a) using the spacers as scale-markers to indicate the orientation of the plates, (b) using the spacers to create more sample flow in a preferred direction, or both.

In certain embodiments, all spacers can have the same shape and dimensions. In certain embodiments, each of the spacers can have different lateral dimensions.

In certain embodiments, for enclosing-spacers or enclosed-spacers, the inner lateral shape and size can be selected based on the total volume of a sample to be enclosed by the enclosed spacer(s), where the volume size has been described above. In certain embodiments, the outer lateral shape and size can be selected based on the strength needed to support the pressure of the liquid against the spacer and the compress pressure that presses the plates.

(viii) Aspect Ratio of Height to the Average Lateral Dimension of Pillar Spacer. In certain embodiments, the aspect ratio of the height to the average lateral dimension of the pillar spacer can be, for example, 100,000, 10,000, 1,000, 100, 10, 1, 0.1, 0.01, 0.001, 0.0001, 0, 0.00001, including intermediate values or ranges.

(ix) Spacer Height Precision. In preferred embodiments, the spacer height should be controlled precisely. The relative precision of the spacer (i.e., the ratio of the deviation to the desired spacer height) can be, for example, 0.001% or less, 0.01%, 0.1%; 0.5, 1%, 2%, 5%, 8%, 10%, 15%, 20%, 30%, 40%, 50%, 60%, 70%, 80%, 90%, 99.9%, including intermediate values or ranges.

(x) Inter-Spacer Distance. The spacers can be a single spacer or a plurality of spacers on the plate or in a relevant area of the sample. In certain embodiments, the spacers on the plates can be, for example, configured, arranged, or both, in an array form, and the array can be periodic, non-periodic, or a mixed array having periodic in some locations of the plate and non-periodic in other locations.

In certain embodiments, the periodic array of the spacers can have, for example, a lattice of square, rectangle, triangle, hexagon, polygon, or any combinations of thereof, where a combination means that different locations of a plate can have different spacer lattice geometries.

In certain embodiments, the inter-spacer distance of a spacer array can be periodic (i.e., having uniform inter-spacer distance) in at least one direction of the array. In certain embodiments, the inter-spacer distance can be configured to improve the uniformity between the plate spacing in a closed configuration.

The distance between neighboring spacers (i.e., the inter-spacer distance) can be, for example, 1 um or less, 5 um, 10 um, 20 um, 30 um, 40 um, 50 um, 60 um, 70 um, 80 um, 90 um, 100 um, 200 um, 300 um, 400 um, including intermediate values or ranges.

In certain embodiments, the inter-spacer distance can be, for example, 400 um or less, 500 um, 1 mm, 2 mm, 3 mm, 5 mm, 7 mm, 10 mm, including intermediate values or ranges. In certain embodiments, the inter-spacer distance can be, for example, 10 mm or less, 20 mm or less, 30 mm or less, 50 mm or less, 70 mm or less, 100 mm or less, including intermediate values or ranges.

The distance between neighboring spacers (i.e., the inter-spacer distance) can be selected so that for a given property of the plates and a sample, in the closed-configuration of the plates, the sample thickness variation between two neighboring spacers can be, in certain embodiments, at most 0.5%, 1%, 5%, 10%, 20%, 30%, 50%, 80%, including intermediate values or ranges; or in certain embodiments, at most 80%, 100%, 200%, 400%, including intermediate values or ranges.

To maintain a given sample thickness variation between two neighboring spacers, when a more flexible plate is used, a closer inter-spacer distance is needed.

In a preferred embodiment, the spacer can be a periodic square array, wherein the spacer can have a pillar that has a height of 2 to 4 um, an average lateral dimension of from 5 to 20 um, and an inter-spacer spacing of 1 um to 100 um.

In a preferred embodiment, the spacer can be a periodic square array, wherein the spacer can have a pillar that has a height of 2 to 4 um, an average lateral dimension of from 5 to 20 um, and an inter-spacer spacing of 100 to 250 um.

In a preferred embodiment, the spacer is can be a periodic square array, wherein the spacer can have a pillar height of 4 to 50 um, an average lateral dimension of from 5 to 20 um, and an inter-spacer spacing of 1 um to 100 um.

In a preferred embodiment, the spacer can be a periodic square array, wherein the spacer can have a pillar height of 4 to 50 um, an average lateral dimension of from 5 to 20 um, and an inter-spacer spacing of 100 to 250 um.

The period of the spacer array can be from 1 to 100 nm in one preferred embodiment, from 100 to 500 nm in another preferred embodiment, from 500 to 1000 nm in a separate preferred embodiment, from 1 (i.e., 1000 nm) to 2 um in another preferred embodiment, from 2 to 3 um in a separate preferred embodiment, from 3 to 5 um in another preferred embodiment, from 5 to 10 um in a separate preferred embodiment, from 10 to 50 um in another preferred embodiment, from 50 to 100 um in a separate preferred embodiment, from 100 to 175 um in a separate preferred embodiment, and from 175 to 300 um in a separate preferred embodiment.

(xi) Spacer Density. The spacers can be arranged on the respective plates at a surface density of greater than one per: 1 $um^2$, 10 $um^2$, 100 $um^2$, 500 $um^2$, 1000 $um^2$, 5000 $um^2$, 0.01 $mm^2$, 0.1 $mm^2$, 1 $mm^2$, 5 $mm^2$, 10 $mm^2$, 100 $mm^2$, 1000 $mm^2$, or 10,000 $mm^2$, including intermediate values or ranges.

In a preferred embodiment, the spacers can be configured to minimize or not occupy any significant surface area (volume) in a given sample area (volume).

(xii) Ratio of Spacer Volume to Sample Volume. In many embodiments, the ratio of the spacer volume (i.e., the volume occupied by the spacers in the sample area) to sample volume (i.e., the volume occupied by the sample in the sample area), or the ratio of the volume of the spacers that are inside of the relevant volume of the sample, can be controlled for achieving certain advantages. The advantages can include, for example, the uniformity of the sample thickness control, the uniformity of analytes, and the sample flow properties (i.e., flow speed, flow direction, and like advantages).

In certain embodiments, the ratio of the spacer volume to the sample volume, the ratio of the volume of the spacers that are inside of the relevant volume of the sample to the relevant volume of the sample, or both, can be, for example, is less than 100%, 99%, 70%, 50%, 30%, 10%, 5%, 3% 1%, 0.1%, 0.01%, or 0.001%, including intermediate values or ranges.

(xiii) Spacers Fixed to Plates. The inter-spacer distance and the orientation of the spacers have a significant role in the disclosed methods, and the distances and the orientations are preferably maintained during the process of bringing the plates from an open configuration to the closed configuration, are preferably predetermined before the process from an open configuration to a closed configuration, or both.

In certain embodiments, the spacers can be fixed on the surface of one of the plates before bringing the plates to the closed configuration. The term "a spacer is fixed with its respective plate" refers to a spacer that is attached to a plate and the attachment is maintained during a use of the plate. An example of "a spacer is fixed with its respective plate" is a spacer that is monolithically made of one piece of material of the plate, and the position of the spacer relative to the plate surface does not change. An example of "a spacer is not fixed with its respective plate" is a spacer that is glued to a plate by an adhesive, but during use of the plate, the adhesive cannot hold the spacer at its original location on the plate surface (i.e., the spacer moves away from its original position on the plate surface).

In certain embodiments, at least one of the spacers can be fixed to a plate or both plates. In certain embodiments, at least two spacers can be fixed to a plate or both plates. In certain embodiments, a majority of the spacers can be fixed to a plate or both plates. In certain embodiments, all of the spacers can be fixed to both of the respective plates.

In certain embodiments, a spacer can be fixed to a plate monolithically.

In certain embodiments, the spacers can be fixed to its respective plate by one or any combination of the following methods, configurations, or both: attached to, bonded to, fused to, imprinted, and etched.

In certain embodiments, the spacers and the plate can be made of the same materials. In other embodiment, the spacers and the plate are made of different materials. In other embodiment, the spacer and the plate can be formed in one piece. In other embodiment, the spacer can have one end fixed to its respective plate, while the second end is open for accommodating different configurations of the two plates.

In other embodiment, each of the spacers independently can be at least one of: attached to; bonded to; fused to; imprinted-in or imprinted-on; or etched in the respective plate. "Independently" means that one spacer can be fixed to its respective plate by a same or a different method selected from: attached to; bonded to; fused to; imprinted in or -on; and etched in the respective plate.

In certain embodiments, at least a distance between two spacers can be predetermined. "Predetermined inter-spacer distance" means that the distance is known when a user uses the plates.

In certain embodiments of all methods and devices described herein, there can be additional spacers besides or in addition to the fixed spacers.

(xiv) Specific Sample Thickness. In the present invention, it was observed that a larger plate holding force (i.e., the force that holds the two plates together) can be achieved by using a smaller plate spacing (for a given sample area), or a larger sample area (for a given plate-spacing), or both.

In certain embodiments, at least one of the plates can be transparent in a region encompassing the relevant area, each plate has an inner surface configured to contact the sample in the closed configuration; the inner surfaces of the plates can be substantially parallel to each other, in the closed configuration; the inner surfaces of the plates can be substantially planar, except the locations that have the spacers; or any combination of thereof.

The spacers can be attached to a plate in a variety of ways, including, for example: lithography, etching, embossing (nanoimprint), depositions, lift-off, fusing, or a combination of thereof. In certain embodiments, the spacers can be directly embossed or imprinted on the plates. In certain embodiments, the spacers can be imprinted into a material (e.g., plastics) that is deposited on the plates. In certain embodiments, the spacers can be made by directly embossing a surface of a CROF plate. The nanoimprinting can be done by roll-to-roll technology using a roller imprinter, or roll to a planar nanoimprint. Such process has a great economic advantage and lower cost.

In certain embodiments, the spacers can be deposited on the plates. The deposition can be, for example, evaporation, pasting, or a lift-off. In the pasting, the spacer can be fabricated first on a carrier, then the spacer can be transferred from the carrier to the plate. In the lift-off, a removable material can be first deposited on the plate and holes are created in the material; the hole bottom exposes the plate surface and then a spacer material can be deposited into the hole and afterwards the removable material can be removed, leaving only the spacers on the plate surface. In certain embodiments, the spacers deposited on the plate can be fused with the plate. In certain embodiments, the spacer and the plates can be fabricated in a single process. The single process includes imprinting (i.e., embossing, molding) or synthesis.

In certain embodiments, at least two of the spacers can be fixed to the respective plate by different fabrication methods, and optionally wherein the different fabrication methods include at least one of: depositing; bonding; fusing; imprinting; and etching.

In certain embodiments, one or more of the spacers can be fixed to the respective plate(s) by a fabrication method of being: bonded, fused, imprinted, or etched, or any combination of thereof.

In certain embodiments, the fabrication methods for forming such monolithic spacers on the plate can include, for example, a method of being: bonded, fused, imprinted, etched, or any combination of thereof.

Methods of Manufacture

Details of the method of manufacture of suitable card devices is disclosed, for example, in International Application No WO2019084513A1, which is incorporated by reference in its entirety.

To reduce non-specific adsorption of cells or compounds released by lysed cells onto the surfaces of the device, one or more surfaces of the device can be chemically modified to be non-adherent or repulsive. The surfaces can be coated with a thin film coating (e.g., a monolayer) of commercial non-stick reagents, such as those used to form hydrogels. Additional examples of chemical species that can be used to modify the surfaces of the device include, for example, an oligoethylene glycol, a fluorinated polymer, an organosilane, a fluorinated organosilane, a thiol, a poly-ethylene glycol, hyaluronic acid, bovine serum albumin, poly-vinyl alcohol, mucin, poly-HEMA, methacrylated PEG, and agarose. Charged polymers can also be employed to repel oppositely charged species. The type of chemical species used for repulsion and the method of attachment to the surfaces of the device can depend on the nature of the species being repelled and the nature of the surfaces and the species being attached. Such surface modification techniques are known in the art. The surfaces can be functionalized before or after the device is assembled. In some embodiments, one or more surfaces of the device can be coated or chemically modified with a capture agent to capture materials in the sample, e.g., membrane fragments or proteins.

In certain embodiments, a method for fabricating any Q-Card of the disclosure can comprise injection molding of the first plate. In certain embodiments, a method for fabricating any Q-Card of the disclosure can comprise nanoimprinting or extrusion printing of the second plate.

In certain embodiments, a method for fabricating any Q-Card of the disclosure can comprise laser cutting the first plate. In certain embodiments, a method for fabricating any Q-Card of the disclosure can comprise nanoimprinting or extrusion printing of the second plate. In certain embodiments, a method for fabricating any Q-Card of the disclosure can comprise injection molding and laser cutting the first plate. In certain embodiments, a method for fabricating any Q-Card of the disclosure can comprise nanoimprinting or extrusion printing of the second plate. In certain embodiments, a method for fabricating any Q-Card of the disclosure can comprise nanoimprinting or extrusion printing to fabricated both the first and the second plate. In certain embodiments, a method for fabricating any Q-Card of the disclosure can comprise fabricating the first plate or the second plate, using injection molding, laser cutting the first plate, nanoimprinting, extrusion printing, or a combination of thereof. In certain embodiments, a method for fabricating any Q-Card of the disclosure can comprise a step of attaching the hinge on the first and the second plates after the fabrication of the first and second plates.

Other Embodiments

Further examples of inventive subject matter according to the present invention are described in the following paragraphs.

As used here and in the appended claims, the singular forms "a", "an", and "the" include plural referents unless the context clearly dictates otherwise, e.g., when the word "single" is used. For example, reference to "an analyte" can include a single analyte and multiple analytes, reference to "a capture agent" can include a single capture agent and multiple capture agents, reference to "a detection agent" can include a single detection agent and multiple detection agents, and reference to "an agent" can include a single agent and multiple agents.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" or "approximately" can mean within an acceptable error range for the particular value as determined by one of ordinary skill in the art, which will depend in part on how the value is measured or determined, i.e. the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, within 5-fold, and more preferably within 2-fold, of a value. Where particular values are described in the application and claims, unless otherwise stated the term "about" meaning within an acceptable error range for the particular value should be assumed. The term "about" has the meaning as commonly understood by one of ordinary skill in the art. In some embodiments, the term "about" refers to ±10%. In some embodiments, the term "about" refers to ±5%.

"Adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined.

What is claimed is:

1. A multiplex assay device, comprising:
a separation structure comprising a hydrophobic trench or a hydrophilic strip on a first plate; and
a sample contact area on the surface of the first plate;
wherein at least a portion of the separation structure is not covered by the sample contact area; and
wherein the separation structure is configured to separate a liquid sample on the first plate into parts.

2. The device of claim 1, further comprising a second plate, wherein the first plate and second plate are movable relative to each other to form different configurations including an open configuration and a closed configuration; and
wherein, in the closed configuration, the separation structure is configured to separate a liquid sample into parts sandwiched between the first and second plates.

3. The device of claim 2, further comprising a second plate, wherein:
the first plate and the second plate are movable relative to each other into different configurations, including an open configuration and a closed configuration;
one or both plates have a spacer including a height of 200 um or less; and
the spacer and the first and second plates regulate a thickness of at least a portion of the sample in the closed configuration.

4. The device of claim 1, wherein the hydrophobic trench surrounds one or more surface patches.

5. The device of claim 1, wherein the hydrophobic trench is a recessed channel in the surface of the plate.

6. The device of claim 1, wherein the trench is a recessed channel in the surface of the plate selected from a single line trench, a single cross-line trench (cross), a double cross-line trench (tick-tac-toe), a three closed square shape trench separation structure, or a combination thereof.

7. The device of claim 1, wherein the separation structure is a trench.

8. The device of claim 1, the hydrophilic strip is a hydrophilic coating on the first plate.

9. The device of claim 1, wherein one dimension of the separation structure is 50 um to 10 mm.

10. The device of claim 1, wherein the hydrophobic trench is a cross trench.

11. The device of claim 8, wherein the separation structure comprises a coating includes a hydrophobic coating, ionic coating, and/or non-ionic coating, and the hydrophobic coating comprises a silane, alkane, oil, fat, or greasy substance.

12. A method for analyzing a liquid sample for an analyte, comprising:
drop a liquid sample on the first plate of the device of claim 3;
close the first and second plates from the open configuration to the close configuration; and
analyzing the equilibrated sample at each separated area for a predetermined analyte in the device with an optical analyzer apparatus.

13. A system for analyzing a sample, comprising:
the device of claim 1;
a mobile communication device comprising:
one or a plurality of cameras for detecting, imaging, or detecting and imaging, the sample;
electronics, signal processors, hardware and software for receiving, processing, or both, the detected signal, the image of the sample, or both, and for remote communication; and
a light source from the mobile communication device or from an external source.

14. A method of making the device of claim 2, comprising:
(a) contacting a first plate with a negative imprint mold to form the base plate having one or more pedestals and one or more recessed areas;
(b) contacting a second plate with a negative imprint mold to form the cover plate having one or more spacers; or
(c) step (a) and step (b); and
(d) combining the two plates into a closed configuration.

15. A method for fabricating the multiplex assay of claim 1, comprising:
creating the separating structure comprising the hydrophobic trench or the hydrophilic strip on the first plate.

* * * * *